United States Patent
Young

(10) Patent No.: US 8,886,214 B2
(45) Date of Patent: Nov. 11, 2014

(54) METHOD AND APPARATUS FOR INCREASING ACCURACY OF WIRELESS BASED REAL-TIME LOCATION SYSTEM (RTLS) DEVICES

(75) Inventor: Stacy Young, Kanata (CA)

(73) Assignee: Adobe Systems Incorporated, San Jose, CA (US)

( * ) Notice: Subject to any disclaimer, the term of this patent is extended or adjusted under 35 U.S.C. 154(b) by 464 days.

(21) Appl. No.: 13/330,175

(22) Filed: Dec. 19, 2011

(65) Prior Publication Data

US 2013/0157685 A1    Jun. 20, 2013

(51) Int. Cl.
*H04W 24/00*    (2009.01)
(52) U.S. Cl.
USPC ............ 455/456.1; 455/456.5; 455/404.2
(58) Field of Classification Search
CPC .... H04W 24/00; H04W 64/00; G01S 5/0221; G01S 5/0252
USPC ........... 455/404.1, 404.2, 456.1–457; 340/539.13, 988–996; D10/104.2
See application file for complete search history.

(56) References Cited

U.S. PATENT DOCUMENTS

| | | | | |
|---|---|---|---|---|
| 7,899,006 | B2 * | 3/2011 | Boyd | 370/328 |
| 2008/0126272 | A1 * | 5/2008 | Cunningham | 706/12 |
| 2009/0298549 | A1 * | 12/2009 | Lai | 455/566 |
| 2009/0305742 | A1 * | 12/2009 | Caballero et al. | 455/566 |
| 2011/0273378 | A1 * | 11/2011 | Alameh et al. | 345/173 |

FOREIGN PATENT DOCUMENTS

EP    1365613    *    5/2002    ........... H04Q 7/38

* cited by examiner

*Primary Examiner* — Ronald Eisner
(74) *Attorney, Agent, or Firm* — Moser Taboada

(57) ABSTRACT

A method and system for increasing accuracy of wireless based Real-Time Location System (RTLS) devices is disclosed. The method comprising determining whether a mobile device is in a dampening state and determining a wireless dampening factor if the mobile device is in the dampening state. The dampening factor is applied to a plurality of wireless signal strength readings to correct inaccurate readings caused by the dampened state. The system comprises a sensor module for determining whether a mobile device is in a dampening state, and a dampening factor calculator for determining a dampening factor, when the mobile device is in the dampening state.

17 Claims, 4 Drawing Sheets

METHOD AND APPARATUS FOR INCREASING ACCURACY OF WIRELESS BASED REAL-TIME LOCATION SYSTEM (RTLS) DEVICES

BACKGROUND OF THE INVENTION

1. Field of the Invention

Embodiments of the present invention generally relate to real-time location systems (RTLS) and, more particularly, to a method and apparatus for increasing accuracy of wireless based Real-Time Location System (RTLS) devices.

2. Description of the Related Art

In real-time location systems (RTLS), the change in location of a mobile device is determined by monitoring the strength of the signals received from various access points proximate the mobile device. The signal strengths received by the mobile device are continuously reported to a location server. Such location tracking of the mobile device has several applications, such as locating a person in a building, in a mall, and/or the like. For example, location tracking using RTLS in a shopping mall may be used for directing advertising specific to the location of an individual in possession of the mobile device. For example, as a person with a mobile device approaches a retail store in a mall, a coupon for that store may be sent to the mobile device in order to entice the user to enter the retail store.

Various techniques are currently used for tracking a mobile device but these techniques are unable to record consistent and accurate tracking signals from various access points. For example, if the mobile device is located in a user's pocket, then the tracking signals received may be relatively weaker than if the mobile device was outside the user's pocket, for example in the user's hand, or on a table. In such cases, although the mobile device is not moving and remains in one location, the reduced signal strength would signal a change in the mobile device's location and be reported to the location server. Accordingly, tracking the signal strength using current techniques may not be accurate and/or consistent for tracking the location of the mobile device.

Therefore, there is a need for an improved method and apparatus for increasing accuracy of wireless based Real-Time Location System (RTLS) devices.

SUMMARY OF THE INVENTION

Embodiments of the present invention generally relate to a method and apparatus for increasing accuracy of wireless based Real-Time Location System (RTLS) devices. In an embodiment, the method comprises determining whether a wireless radio in a mobile device is in a dampening state, and if so, determining a wireless dampening factor. The dampening factor is applied to the signal strength readings to correct the inaccurate readings caused by the dampened state.

Figure 1:
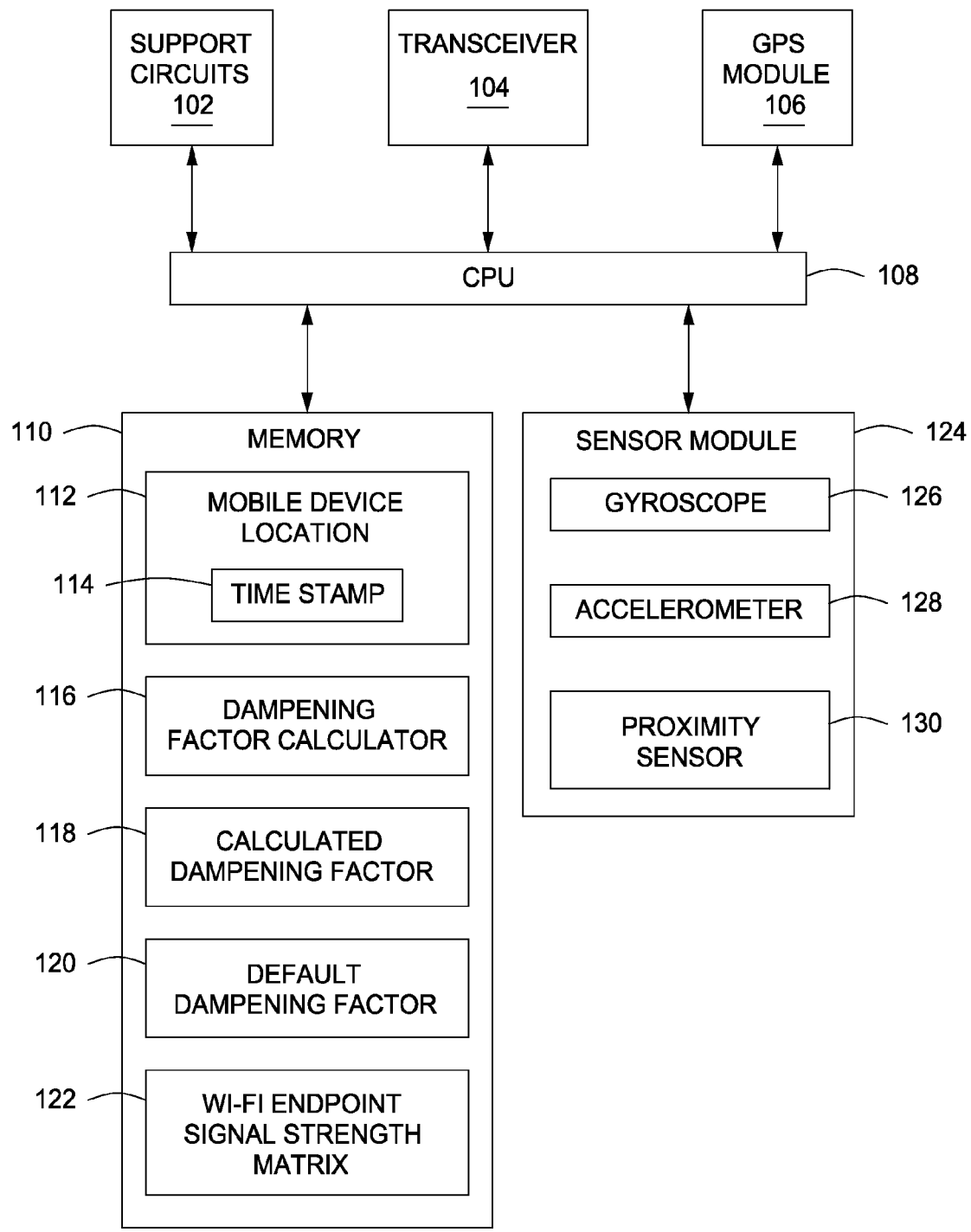
FIG. 1 depicts a block diagram of a mobile device for use in a system for increasing accuracy of wireless based Real-Time Location System (RTLS) devices, according to one or more embodiments of the invention.

While the method and apparatus is described herein by way of example for several embodiments and illustrative drawings, those skilled in the art will recognize that the method and apparatus for increasing accuracy of wireless based Real-Time Location System (RTLS) devices are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for increasing accuracy of wireless based Real-Time Location System (RTLS) devices as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for increasing accuracy of wireless based Real-Time Location System (RTLS) devices. The embodiments determine whether wireless signals received by the mobile device are accurate based on whether a mobile device is in a dampening state and, if it is determined that the mobile device is in the dampening state, calculate a corrective dampening factor. The dampening factor is used to extrapolate from the dampened signal strength to determine the 'true' signal strength such that it can then be compared to baseline measurements in order to determine device location. The dampening factor compensates for dampened wireless signal strength readings when a mobile device is placed in a dampening environment such as a user's pocket, backpack, handbag or the like. Using the dampening factor, the mobile device arrives at more accurate wireless signal strength readings.

Various embodiments of an apparatus and method for increasing accuracy of wireless based Real-Time Location System (RTLS) devices are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a mobile device 100 for use in a system for increasing accuracy of wireless based Real-Time Location System (RTLS) devices, according to one or more embodiments. The mobile device 100 comprises a transceiver 104, a Global Positioning System (GPS) 106, a CPU 108, a memory 110, support circuits 102, and a sensor module 124. The sensor module 124 comprises a gyroscope 126, an accelerometer 128, and a proximity sensor 130.

The mobile device 100 is a type of computing device (e.g., a laptop, a desktop, a Personal Digital Assistant (PDA), a tablet, a mobile phone and/or the like) known to one of ordinary skill in the art. The CPU 108 may comprise one or more commercially available microprocessors or microcontrollers that facilitate data processing and storage. The various support circuits 102 facilitate the operation of the CPU 108 and include one or more clock circuits, power supplies, cache, input/output circuits, displays, and the like. The memory 110 comprises at least one of Read Only Memory (ROM), Random Access Memory (RAM), disk drive storage, optical storage, removable storage and/or the like. The memory 110 comprises a mobile device location 112, a dampening factor calculator 116, a calculated dampening factor 118, a default dampening factor 120, and a wireless endpoint signal strength matrix 122. The mobile device location 112 includes a time stamp 114.

The timestamp 114 represents a time at which an event is recorded by a processor (i.e., the CPU 108). The time at which an event is recorded in the timestamp 114 should be very close to the time of the occurrence of the event. In some embodiments, the event is the recording of the location of the mobile device 100.

The sensor module 124 utilizes one or more of the gyroscope 126, the accelerometer 128, and/or the proximity sensor 130 to determine whether the mobile device 100 is in a user's hand or on a surface (such as a table), for example. If the mobile device 100 is in the user's hand or on a surface), then the signal strength received by the transceiver 104 is typically not dampened or not in a dampening state. Alternatively, the sensor module 124 may determine that the mobile device 100 is in a user's pocket or elsewhere concealed on their person such that the mobile device is significantly blocked by the user's clothing, backpack or the like, thereby creating some obstructions in reading wireless end point signal strengths. In such cases, the signal strength received by the transceiver 104 is typically dampened or in a dampening state.

According to some embodiments, the sensor module 124 determines whether the mobile device 100 is near a surface by reading the proximity sensor 130 of the mobile device 100. In some embodiments, the proximity sensor 130 utilizes a state machine associated with device positioning, having current states of open or dampened. The state machine is driven by events raised by the proximity sensor 130. When proximity changes, the device 100 re-evaluates the current state. Further, the sensor module 124 determines which surface the mobile device 100 is near by determining whether the surface is a person holding the device 100 or whether the mobile device 100 is lying on a surface. The sensor module 124 determines whether the surface is a person by determining whether a voice call is in progress on the mobile device 100. If a voice call is in progress, the mobile device is assumed to be against a user's ear, but if no voice call is in progress, it determines whether the mobile device 100 is lying against any other surface by accessing readings from the gyroscope 126 and/or the accelerometer 128.

When it is determined that the mobile device 100 is in a dampening state, the dampening factor calculator 116 calculates a dampening factor, which is used to correct dampened wireless endpoint signal strength readings, thereby providing more accurate readings.

The dampening factor calculator 116 retrieves a previous location of the mobile device from the mobile device location 112. The dampening factor calculator 116 determines whether the location time-to-live (TTL) has expired. The dampening factor calculator 116 calculates a new dampening factor when the TTL has not expired. If the TTL has expired, the dampening factor calculator 116 retrieves a previously determined dampening factor, as described with respect to FIG. 3 below.

The dampening factor calculator 116 uses the signal strength matrix 122 to calculate a new dampening factor when the TTL has not expired. In an embodiment, the wireless end point signal strength matrix 122 includes wireless end point signal strength values for a plurality of wireless access points. The wireless end point signal strength matrix 122 is generated by reading and measuring wireless end point signal strengths of various access points proximate the mobile device 100. The signal strength of an access point increases or decreases based on the proximity of the access point to the mobile device 100. The wireless end point signal strength matrix 122 maintains a log of at least the immediately previous wireless end point signal strength. The dampening factor calculator 116 measures a plurality of current wireless endpoint signal strengths and retrieves the previous wireless endpoint signal strengths from the wireless endpoint signal strength matrix 122. The dampening factor calculator 116 calculates a new dampening factor by calculating the difference between the previous wireless end point signal strengths and the current wireless end point signal strengths. This calculated difference will be applied to the dampened signal strength readings measured by the mobile device. The dampening factor calculator 116 records the calculated dampening factor.

Alternatively, the dampening factor calculator 116 calculates the dampening factor when the TTL has expired by determining whether a previous dampening factor has been calculated for the mobile device 100. The dampening factor calculator 116 retrieves the previous dampening factor from the calculated dampening factor 118, when the previous dampening factor exists. In some embodiments, the calculated dampening factor 118 is a dampening factor previously calculated for the mobile device 100. Alternatively, the dampening factor calculator 116 retrieves a default dampening factor 120 when the previous dampening factor does not exist. In some embodiments, the default dampening factor 120 includes pre-configured values determined by a system administrator.

Figure 2:
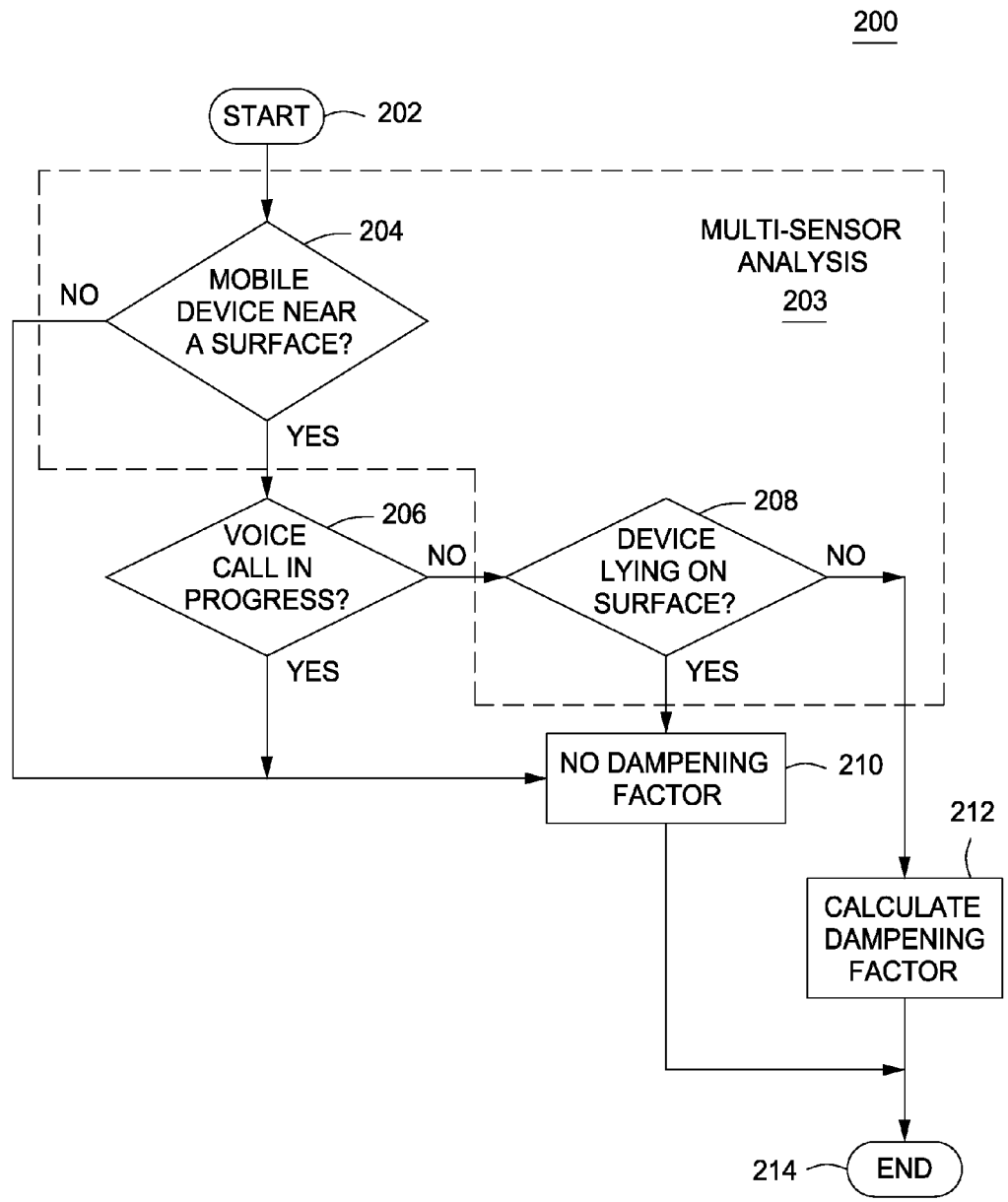
FIG. 2 depicts a flow diagram of a method for determining whether the mobile device is in a dampening state, according to one or more embodiments of the invention.

FIG. 2 depicts a flow diagram of a method 200 for determining whether the mobile device is in a dampening state, according to one or more embodiments. FIG. 2 depicts a flow diagram of a method 200 for determining whether the mobile device is in a dampening state, as implemented by the sensor module 124 of FIG. 1, according to one or more embodiments. Steps 204 and 208 are performed by multi-sensor analysis using the gyroscope 126, the accelerometer 128, and the proximity sensor 130 of the sensor module 124 of FIG. 1. The multi-sensor analysis 203 is depicted by dotted lines in FIG. 2.

The method 200 starts at step 202 and, at step 204, determines whether the mobile device is near a surface. In an embodiment, the proximity sensor detects if the mobile device is near any object or surface. If the method 200 determines that the mobile device is near a surface, the method 200 proceeds to step 206. If, at step 204, the method 200 determines that the mobile device is not near a surface, the method 200 proceeds to step 210. At step 210, the method 200 determines that the mobile device is not in a dampened state. The method proceeds to step 214, where the method 200 end.

At step 206, the method 200 determines whether a voice call is in progress on the mobile device. If the method 200 determines that a voice call is in progress, the method 200 proceeds to step 210. At step 210, the method 200 determines that the mobile device is not in a dampened state. If a voice call is in progress, it can be concluded that the person is holding the mobile device up to his or her ear and the mobile device is not in a dampening state. At step 206, if the method 200 determines that a voice call is not in progress on the mobile device 100, the method 200 proceeds to step 208.

At step 208, the method 200 determines whether the mobile device is lying on a surface. If the method 200 determines that the mobile device is lying on a surface, the method 200 proceeds to step 210. At step 210, the method determines that the mobile device is not in a dampened state. If the voice call is not in progress (but the mobile device is near a surface), the method 200 determines whether the mobile device is lying on a surface, such as a table or a desk by accessing the mobile device's gyroscope and the accelerometer to determine whether the phone is moving. If not, the mobile device is near a surface, there is no voice call in progress, and the phone is not moving. It can be concluded that the mobile device is place on an open stationary surface such as a table and the mobile device is not in a dampening state. If at step 208, the method 200 determines that the mobile device is not lying on a surface, the method 200 proceeds to step 212. If the mobile device is not moving based on the gyroscope and/or accelerometer readings, then the method 200 concludes the mobile device is not lying on a surface, and it is concluded that the mobile device is in an enclosed place on the person, such as a pocket, a backpack, handbag or the like, and therefore, the mobile device is in a dampening state. The clothing creates an obstruction in reading wireless endpoint signal strengths and therefore the mobile device is in a dampening state. At step 212, a dampening factor is calculated. In an embodiment, the dampening factor calculator 116 of FIG. 1 determines a dampening factor as explained further with reference to the flow diagram of FIG. 3. The method 200 ends at step 214.

Figure 3:
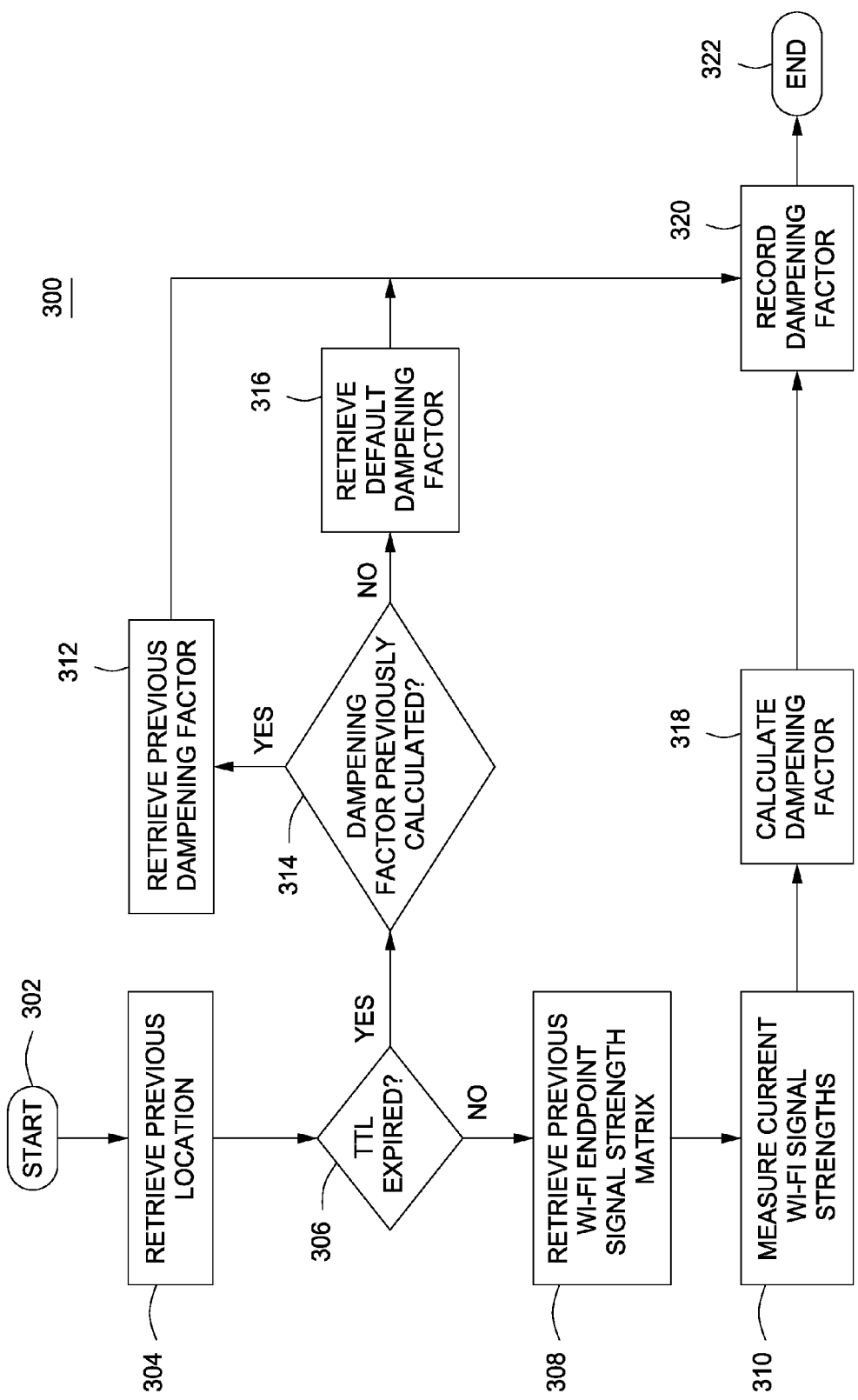
FIG. 3 depicts a flow diagram of a method for determining the dampening factor through an exemplary implementation of the dampening factor calculator of FIG. 1, according to one or more embodiments of the invention.

FIG. 3 depicts a flow diagram of a method 300 for determining the dampening factor through an exemplary implementation of the dampening factor calculator 116 of FIG. 1, according to one or more embodiments. The method 300 calculates the dampening factor after confirming that the mobile device is in a dampening state, for example, as illustrated by FIG. 2 and dampening factor is calculated for signal strength correction.

The method 300 starts at step 302 and proceeds to step 304 wherein the method 300 retrieves the location of the mobile device from the mobile device location 112 of FIG. 1. At step 306, the method 300 determines whether the time-to-live (TTL) is expired. If the method 300 determines that the TTL is expired, the method 300 proceeds to step 314. If at step 306, the method 300 determines that the TTL is not expired, the method 300 proceeds to step 308. In some embodiments, the TTL is defined as a time between two consecutive cycles. The TTL is used to limit the lifespan of the dampening factor. In an embodiment, if the timespan has elapsed, the previous dampening factor is discarded and the method 300 proceeds to step 308 to calculate a new dampening factor.

At step 308, the method 300 retrieves the previous Wi-Fi end point signal strength matrix from the wireless end point signal strength matrix 122 of FIG. 1. At step 310, the method 300 measures the current wireless end point signal strengths from the wireless end points. At step 318, the method 300 calculates a dampening factor. In some embodiments, the dampening factor calculator calculates the difference between the previous wireless end point signal strengths and the current wireless end point signal strengths to arrive at the dampening factor.

At step 314, the method 300 determines whether the dampening factor has previously been calculated. If the method 300 determines that the dampening factor has previously been calculated, the method 300 proceeds to step 312. At step 314, if the method 300 determines that the dampening factor has not previously been calculated, the method 300 proceeds to step 316. At step 316, the method 300 retrieves the default dampening factor from the default dampening factor 120 of FIG. 1. The default dampening factor may be a pre-configured value determined by a system administrator. The method 300 proceeds to step 320. At step 320, the method 300 records the dampening factor. The method then proceeds to step 322 and ends.

At step 312, the method 300 retrieves the previous dampening factor from the calculated dampening factor 118 of FIG. 1. At step 320, the dampening factor is recorded. In some embodiments, the method 300 records the dampening factor as the calculated dampening factor 118 of FIG. 1. The method 300 proceeds to step 322 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 4:
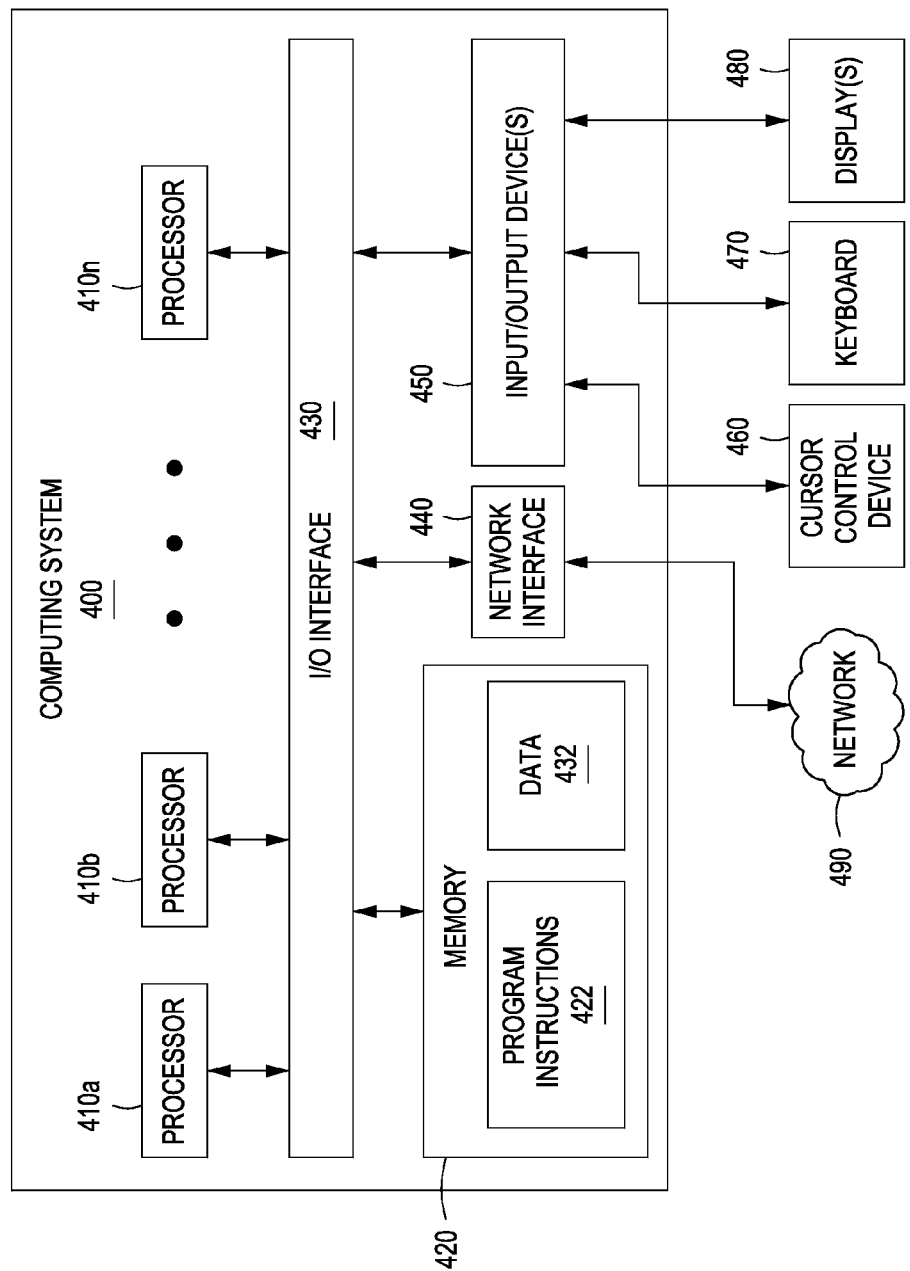
FIG. 4 depicts a computer system that can be used to implement the methods of FIGS. 2 and 3 in various embodiments of the present invention, according to one or more embodiments of the invention.

FIG. 4 depicts a computer system that can be utilized in various embodiments of the present invention, according to one or more embodiments.

Various embodiments of a method and apparatus for increasing accuracy in wireless based Real-Time Location System (RTLS) devices, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement methods 200 and 300, as processor-executable executable program instructions 422 (e.g., program instructions executable by processor(s) 410) in various embodiments.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowcharts of FIGS. 2-3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method of increasing accuracy of wireless based Real-Time Location system (RTLS) devices comprising:
   determining whether a mobile device is in a dampening state;
   determining a wireless dampening factor; and
   applying the dampening factor to a plurality of wireless signal strength readings, wherein determining a dampening factor comprises:
   retrieving a previous location of a mobile device;
   determining whether a location time-to-live (TTL) has expired;
   calculating the dampening factor when the TTL has not expired; and
   retrieving a previously determined dampening factor when the TTL has expired.

2. The method of claim 1, wherein determining whether a mobile device is in a dampening state comprises:
   determining whether the mobile device is sufficiently near a surface for the surface to potentially cause obstruction in reading wireless endpoint signal strengths.

3. The method of claim 1, wherein calculating a dampening factor comprises:
   retrieving a previous wireless endpoint signal strength matrix;
   measuring a plurality of current wireless endpoint signal strengths;
   calculating a dampening factor based on the previous wireless signal strength readings from the wireless signal strength matrix and the current wireless signal strength readings; and
   recording the dampening factor.

4. The method of claim 1, wherein retrieving a dampening factor comprises:
   determining whether a previous dampening factor has been calculated for the mobile device;
   retrieving the previous dampening factor when one exists; and
   retrieving a default dampening factor when a previous dampening factor does not exist.

5. The method of claim 2, wherein determining whether a mobile device is sufficiently near a surface comprises reading a proximity sensor on the mobile device.

6. The method of claim 2, further including determining whether a surface determined to be sufficiently close is a person holding the mobile device or whether the mobile device is lying on the surface.

7. The method of claim 6, wherein determining whether a surface is a person comprises determining whether a voice call is in progress.

8. The method of claim 6, wherein determining whether the device is lying on a surface comprises accessing gyroscope and accelerometer readings of the mobile device to determine movement and orientation of the mobile device.

9. The method of claim 1, wherein determining whether the location TTL has expired comprises determining whether the previous location was recorded within a predefined time interval.

10. The method of claim 4, wherein the default dampening factor is based on a pre-configured value.

11. A system for increasing accuracy of wireless based Real-Time Location system (RTLS) devices comprising:
   a sensor module for determining whether a mobile device is in a dampening state;
   a dampening factor calculator for determining a dampening factor, when the wireless radio in the mobile device is in the dampening state; and
   a memory for storing wireless signal strength readings to which the dampening factor has been applied, wherein the dampening factor calculator is configured to determine a dampening factor by:
   retrieving a previous location of a mobile device;
   determining whether a location time-to-live (TTL) has expired;
   calculating the dampening factor when the TTL has not expired; and
   retrieving a previously determined dampening factor when the TTL has expired.

12. The system of claim 11, wherein the sensor module comprises a gyroscope, an accelerometer and a proximity sensor.

13. The system of claim 11 further comprising a default dampening factor for storing pre-defined dampening factor value as per a policy.

14. The system of claim 11 further comprising a wireless end point signal matrix for storing previous wireless end point signal and current wireless end point signal.

15. The system of claim 11, wherein the wireless radio is a transceiver of the mobile device.

16. A non-transitory computer readable medium for storing computer instructions that, when executed by at least one processor cause the at least one processor to perform a method of increasing accuracy of wireless based Real-Time Location system (RTLS) devices comprising:
   determining whether a mobile device is in a dampening state;
   determining a wireless dampening factor; and
   applying the dampening factor to a plurality of wireless signal strength readings, wherein determining a dampening factor comprises
   retrieving a previous location of a mobile device;
   determining whether a location time-to-live (TTL) has expired;
   calculating the dampening factor when the TTL has not expired; and
   retrieving a previously determined dampening factor when the TTL has expired.

17. The non-transitory computer readable medium of claim 16, wherein determining whether a mobile device is in a dampening state comprises:
   determining whether the mobile device is sufficiently near a surface for the surface to potentially cause obstruction in reading wireless endpoint signal strengths;
   determining what surface the mobile device is near; and
   applying the dampening factor to a plurality of wireless signal strength readings.

* * * * *